United States Patent
Fiammante

(10) Patent No.: US 10,586,129 B2
(45) Date of Patent: Mar. 10, 2020

(54) GENERATING ARTIFICIAL IMAGES FOR USE IN NEURAL NETWORKS

(71) Applicant: INTERNATIONAL BUSINESS MACHINES CORPORATION, Armonk, NY (US)

(72) Inventor: Marc Fiammante, Cagnes sur Mer (FR)

(73) Assignee: International Business Machines Corporation, Armonk, NY (US)

(*) Notice: Subject to any disclaimer, the term of this patent is extended or adjusted under 35 U.S.C. 154(b) by 191 days.

(21) Appl. No.: 15/900,921

(22) Filed: Feb. 21, 2018

(65) Prior Publication Data

US 2019/0258898 A1    Aug. 22, 2019

(51) Int. Cl.
  *G06K 9/42* (2006.01)
  *G06K 9/62* (2006.01)
  *G06K 9/46* (2006.01)

(52) U.S. Cl.
  CPC ............ *G06K 9/6255* (2013.01); *G06K 9/42* (2013.01); *G06K 9/4619* (2013.01); *G06K 9/4652* (2013.01)

(58) Field of Classification Search
  CPC ...... G06K 9/6255; G06K 9/42; G06K 9/4619; G06K 9/4652; G06K 9/78; H04N 5/32; H04N 5/367
  USPC ........................................................ 382/157
  See application file for complete search history.

(56) References Cited

U.S. PATENT DOCUMENTS

| | | | | |
|---|---|---|---|---|
| 5,815,608 A | * | 9/1998 | Lange | G06K 9/78 382/312 |
| 6,792,159 B1 | * | 9/2004 | Aufrichtig | H04N 5/367 348/E5.081 |
| 9,542,626 B2 | | 1/2017 | Martinson et al. | |
| 2008/0212887 A1 | * | 9/2008 | Gori | G06K 9/4619 382/248 |
| 2017/0254932 A1 | * | 9/2017 | Huang | G02B 5/0294 |
| 2018/0124330 A1 | * | 5/2018 | Herbst | G01C 11/00 |

FOREIGN PATENT DOCUMENTS

| | | |
|---|---|---|
| CN | 104992177 A | 10/2015 |
| CN | 106780466 A | 5/2017 |
| WO | 2015065697 A1 | 5/2015 |

OTHER PUBLICATIONS

Pan et al., "Efficient Object Recognition Using Boundary Representation and Wavelet Neural Network", IEEE Transactions on Neural Networks, vol. 19, No. 12, Dec. 2008, pp. 2132-2149.

(Continued)

*Primary Examiner* — Ali Bayat
(74) *Attorney, Agent, or Firm* — Tihon Poltavets

(57) ABSTRACT

A method includes creating an input matrix of image data for a received input image and responsive to selecting a first image filter for generating an artificial image, the method applies a first filter computation for the first image filter to the input matrix of image data, where applying the first filter computation generates a first resulting matrix of image data. The method concatenates the first resulting matrix of image data to the input matrix of image data to generate a first concatenated matrix of image data. The method generates an artificial image suitable for use in neural networks based on the concatenated matrix of image data.

20 Claims, 11 Drawing Sheets

(56) References Cited

OTHER PUBLICATIONS

Alom et al., "Inception Recurrent Convolutional Neural Network for Object Recognition", arXiv:1704.07709v1 [cs.CV], Apr. 25, 2017, pp. 1-11.
Mell et al., "The NIST Definition of Cloud Computing", National Institute of Standards and Technology, Special Publication 800-145, Sep. 2011, pp. 1-7.

* cited by examiner

GENERATING ARTIFICIAL IMAGES FOR USE IN NEURAL NETWORKS

The present invention relates to image processing using neural networks, and more specifically, to generating artificial images for use in neural networks.

BACKGROUND

Artificial neural networks (ANNs) are computing systems inspired by the biological neural networks that constitute animal brains. Such systems learn and progressively improve performance on tasks by considering and training from examples.

An ANN is based on a collection of connected units or nodes called artificial neurons. Each connection (synapse) between neurons can transmit a signal from one to another. The receiving (postsynaptic) neuron can process the signal(s) and then signal neurons connected to it.

In common ANN implementations, the synapse signal is a real number, and the output of each neuron is calculated by a non-linear function of the sum of its inputs. Neurons and synapses typically have a weight that adjusts as learning proceeds. The weight increases or decreases the strength of the signal that it sends across the synapse. Neurons may have a threshold such that the signal is only sent if the aggregate signal crosses the threshold.

Typically, neurons are organized in layers. Different layers may perform different kinds of transformations on their inputs. Signals travel from the first (input) to the last (output) layer, possibly after traversing the layers multiple times.

In machine learning, a convolutional neural network (ConvNet) is a class of deep, feed-forward artificial neural networks that has successfully been applied to analyzing visual imagery.

ConvNet use a variation of multilayer perceptrons designed to require minimal pre-processing. They are also known as shift invariant or space invariant artificial neural networks (MANN) based on their shared-weights architecture and translation invariance characteristics.

ConvNet use relatively little pre-processing compared to other image classification algorithms. This means that the network learns the filters that in traditional algorithms were hand-engineered.

Neural networks typically use a matrix vector linear product between layers with a common function applied element wise to the resulting vector function which may result in non-linear layers such as radial basis or threshold rectified layers. However, more complex non-linear layers requiring a per element function such as Fourier decompositions, polynomial or absolute value or multiple thresholds are difficult to implement and the back propagation through such layers is not always solvable.

In addition, the result of layers replaces the input data and is not an addition to the input data. Multiple paths in neural networks have to be added if the previous input needs to be propagated such as with Residual Neural Networks.

SUMMARY

Embodiments in accordance with the present invention disclose a method, computer program product and computer system for generating artificial images for use in neural networks. An input matrix of image data is created for a received image. Responsive to a first image filter being selected for generating an artificial image, a first filter computation for the first image filter is applied to the input matrix of image data, wherein applying the first filter computation generates a first resulting matrix of image data. The first resulting matrix of image data is concatenated to the input matrix of image data to generate a first concatenated matrix of image data. An artificial image suitable for use in neural networks is generated based on the concatenated matrix of image data.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for generating artificial images for use in neural networks. The artificial images use an additive approach to the input data so that the added information is only computed once, resulting in reduced memory utilization of computing devices in the neural network. This means that computing devices do not need computation by each network layer and does not need computation for each neural network iteration. This removes the need to use a layer in a neural network to compute linear or non-linear filters.

The described method improves image recognition for neural networks by pre-computing image filters by augmenting images to generate artificial images. Artificial images are generated by augmenting an initial image by pre-computing image filters and obtaining new image data. The artificial images may be injected into the neural networks for better image recognition.

In computer graphics, a raster graphic or bitmap image is a dot matrix data structure representing a generally rectangular grid of pixels or points of color. Raster images are made up of bands and are stored in image files with varying formats. For images with multiple bands (red, green blue colors, infrared, etc.) each pixel contains one element per band.

In the described method, elements are added to a matrix (such as a dot matrix data structure) representing an input image to create an artificial image that is equivalent to adding the filtered images side by side to the original image.

The dimension of the concatenated image is such that Width*Height is sufficient to contain the sum of (Width*Height) of all filters plus the original image. The filtered images may be placed in various arrangements appended to the final image including under, to the right, left or a mixture, provided that the selected placement is the same for all images.

A neural network is fed with the artificial image made up of the input image and the filtered images taken as one single image. This overcomes the issue that non-differentiable filters are not realisable with Convolutional Neural Networks. By feeding an artificial image that include filters and non-differentiable filters, the recognition rate is improved.

Figure 1:
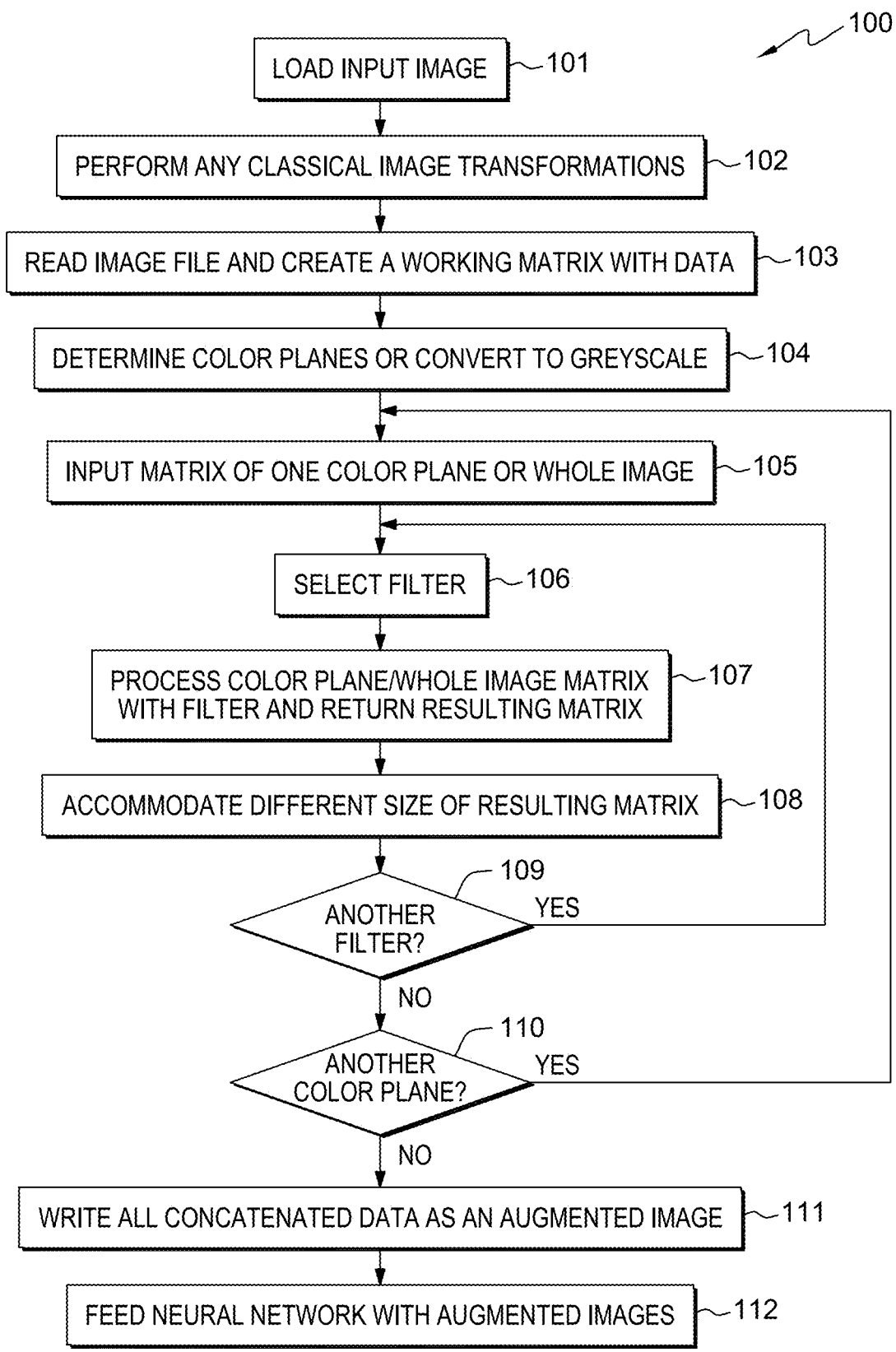
FIG. 1 is a flow diagram of an example embodiment of a method, in accordance with an embodiment of the present invention.

Referring to FIG. 1, a flow diagram 100 shows an example embodiment of the described method of generating artificial images for use in neural networks. The method is applied to all images in the training, cross validation and test set. After training, the same method is applied to any image that is tested.

An input image may be loaded 101, for example, as one of multiple images in a training set for a neural network or as an image to be recognized.

The method may perform 102 any classical image augmentation transformations on the input image. Classical image augmentation transformation may include shift, flip, rotate, noise addition or removal, zoom, etc. or any combination of these transformations. This may be an automated process, for example, using Python pre-processing (Python is a trademark of Python Software Foundation).

The image file may be read and a working matrix of pixels with data may be created 103. This may load the input image as a matrix of pixels, which is a matrix of Width*Height for grey images (panchromatic), or Width*Height*Number of Color Layers for colored images, usually 3 layers for Red, Green and Blue.

The input image may be panchromatic or colored. If the input image is colored, the method may determine 104 color planes or convert the colored image to greyscale. The color plane processing is described in further detail with reference to FIG. 2.

If the image is panchromatic, the filter computation process described below may be applied for the whole image as a single entity.

If the image is a colored image, the value matrices for the color layers in addition to the first layer can be handled in alternative ways. They may be concatenated to the first layer creating an artificial grey image of the same width but with a height of matrix of Number of Color Layers multiplied by the original height. Alternatively, another approach is to apply the filter computation process for each color layer separately.

Therefore, the method may input 105 an input matrix of a first color plane or the whole image for processing.

A filter may be selected 106 to be applied. The list of filters below is a typical list but more or less filters may be used:
    Threshold Binary Inverted or Not;
    Threshold Truncate;
    Threshold to Zero;
    Canny edges;
    Absolute difference between Gaussian Blur and Median Blur;
    Wavelet multiple approximations, 'a', 'aa' with db1 or other Wavelet algorithms
    Resized to image size;
    Median Blur;
    Contours on Canny Edge.

The filters in the above list are complex non-linear filters but there may be simpler or linear filters.

The method may process 107 the input matrix for the color plane or whole image with the selected filter and return a resulting matrix. Each selected filter is implemented as a function of the input matrix that returns a resulting matrix as output.

The resulting matrix may be of the same size as the input matrix or may be larger or smaller and the method may accommodate 108 different sizes of the resulting matrix as described in further detail with reference to FIG. 3.

It may be determined 109 if there is another selected filter. If so, the method may loop to iterate for the next filter 106. In this way, multiple filters may be applied to a color plane or the entire image if a panchromatic image.

Once there are no more filters to apply, the method may determine 110 if there is another color plane. If so, the method may iterate to input 105 a matrix of the next color plane and apply the filters to the next color plane.

Once there are no more color planes, the method may write 111 all resulting matrices as a concatenated matrix of concatenated data in a new artificial image. The resulting matrices are appended adjacent the input image matrix or a previously returned resulting matrix. A concatenated matrix is produced as a result of the concatenation of computed filter matrices to each original matrix defining each color plane. If all colors were filtered separately as color planes, this may create an image with the same number of color planes.

When all images in an input have been processed, a neural network may be fed 112 with the augmented artificial images.

Figure 2:
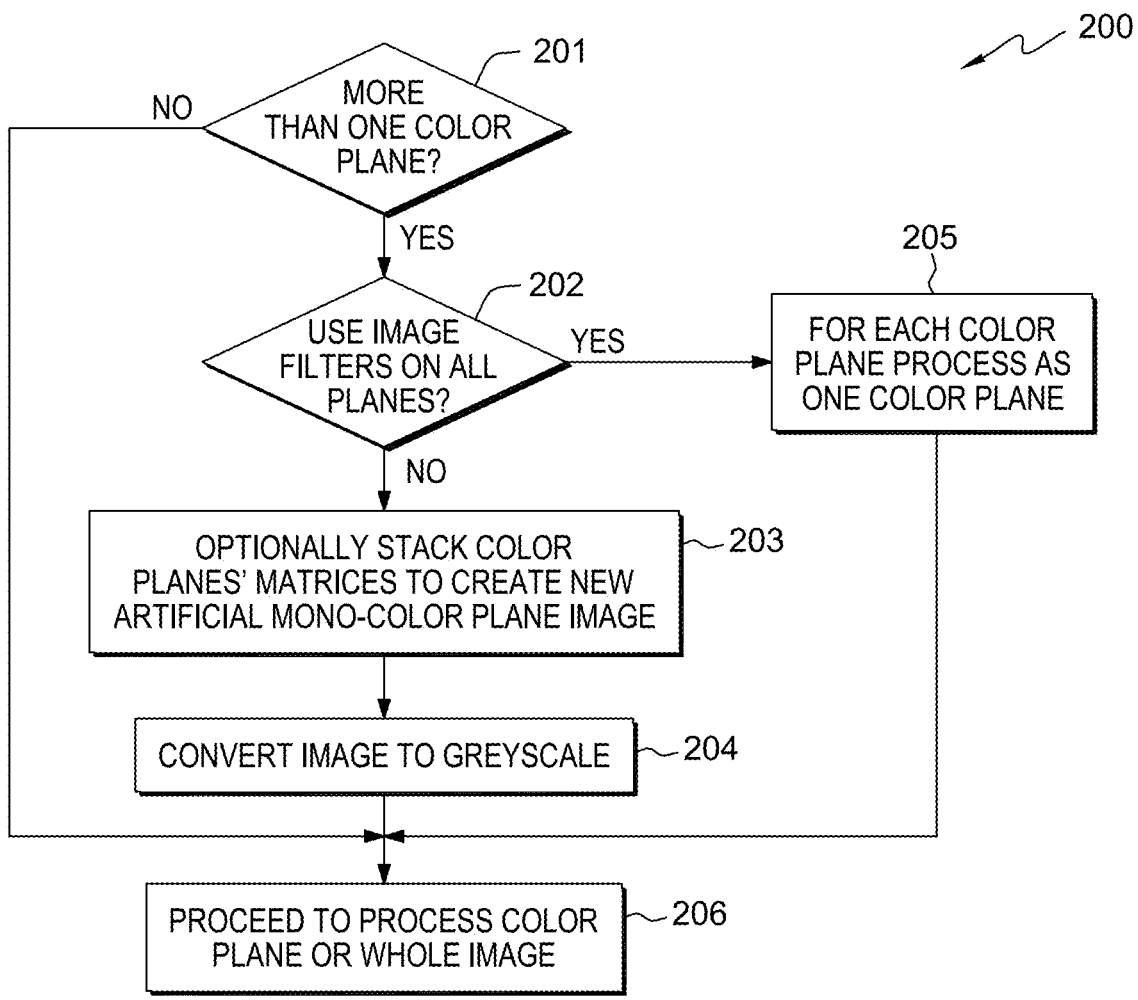
FIG. 2 is a flow diagram of an example embodiment of an aspect of the method of FIG. 1, in accordance with an embodiment of the present invention.

Referring to FIG. 2, a flow diagram 200 shows an example embodiment of the aspect of FIG. 1 of determining 104 color planes or converting to a greyscale or panchromatic image.

The method may determine 201 if there is more than one color plane. If there is not more than one color plane, the method may proceed to process 206 the whole image in step 105 of FIG. 1. The image is panchromatic and the filter computation process described may be applied for the whole image as a single entity.

If there are more than one color planes, it may be determined 202 if the image filters are to be used on all the planes. If the filters are not to be used on all the color planes, the method may optionally stack 203 the color plane matrices to create a new artificial mono-color plane image. The image may be converted 204 to a greyscale image. The color planes may be concatenated to the first layer creating an artificial grey image of the same width but with a height of matrix of Number of Color Layers multiplied by the original height. The method may proceed to process 206 the whole image in step 105 of FIG. 1.

If it is determined 202 that the image filters are to be used on all the planes, each color plane may be processed 205 as one color plane and the method may proceed to process 206 each color plane in step 105 of FIG. 1.

Figure 3:
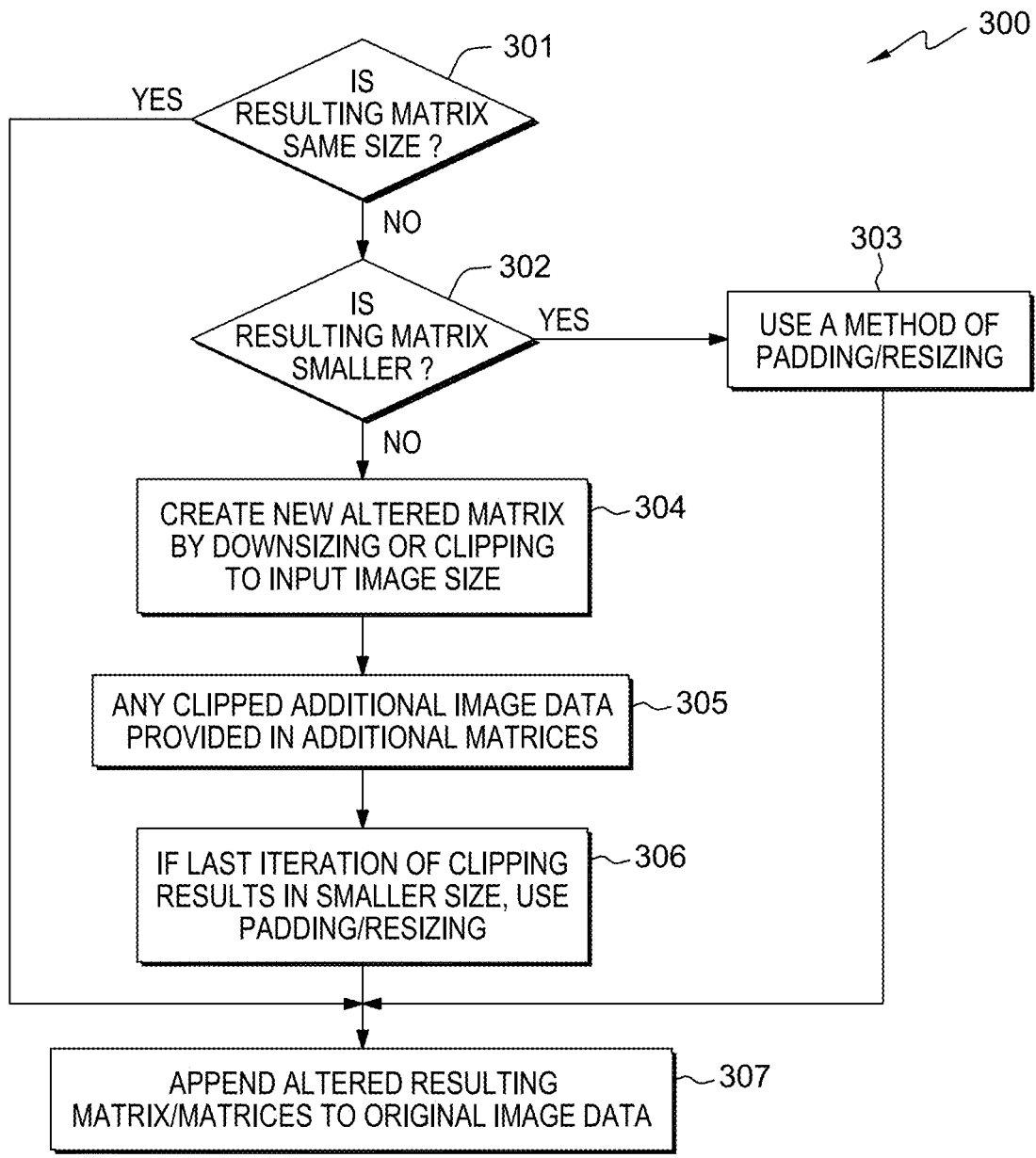
FIG. 3 is a flow diagram of an example embodiment of another aspect of the method of FIG. 1, in accordance with an embodiment of the present invention.

Referring to FIG. 3, a flow diagram 300 shows an example embodiment of the aspect of FIG. 1 of accommodating 108 different sizes of resulting matrix after applying a filter.

It may be determined 301 if the resulting matrix is the same size as the input image. If the resulting matrix is of the same size, then the matrix is appended 307 to the original image data by concatenating it adjacent the original image data.

It may be determined 302 if the resulting matrix is smaller than the input matrix, such as with wavelet approximations. If so, a method of padding or resizing may be used 303. The resulting matrix data may be resized by using common image resizing functions with pixel duplication, interpolation or extrapolation, or the matrix may be padded to match image Width and Height with constant values, usually zero. The altered resulting matrix is appended 307 to the original image data by concatenating it adjacent the original image data.

If it is determined 302 that the resulting matrix is not smaller than the input matrix, the resulting matrix is larger than the original Width*Height. If the resulting matrix is larger than the original Width*Height, then a new altered matrix may be created 304 by downsizing or clipping the matrix to the same Width and Height as the original image. Downsizing uses classical image resizing such as resampling using pixel area relation or bilinear interpolation. When clipping additional matrices of image Weight and Height are computed to fit all the values of the computed filter, with the data not fitting in the initial matrix size moved 305 or clipped to additional matrices. The method may iterate to add additional matrices for additional data and if the last iteration results in a smaller size, padding or resizing may be used 306.

In this way a new altered matrix is created by clipping to the same Width as the original image and additional matrices of image Height computed to fit all the values of the computed filter. The altered resulting matrix or matrices are appended 307 adjacent the original image matrix and any previously processed filter.

It is not necessary that the filter matrix elements' coordinates match the initial image coordinates. However the process needs to be consistent, and the same filter data resulting from a computation needs to always be placed with the same logic. This is an advantage of neural networks. Neural networks read all pixels line after line and create a vector by concatenating them. So the additions from a given filter need to always be at the same coordinates relative to the original image. The normal neural network iterations will then work out that the element at these coordinates relates to the coordinates of other elements in the original image.

In the preferred embodiment the new matrix or matrices are appended below the original image matrix and its previously added filter data. However the additional image data could be placed anywhere to the left, right, top, or any rectangular layout.

In the preferred embodiment the (width, height) size of the new image becomes (width, height*(1+number of filters)). Other embodiments could select (width*(1+number of filters), height) or (width*(1+x), height (1+y)) where (1+x)*(1+y)−1>number of filters.

Figure 4:
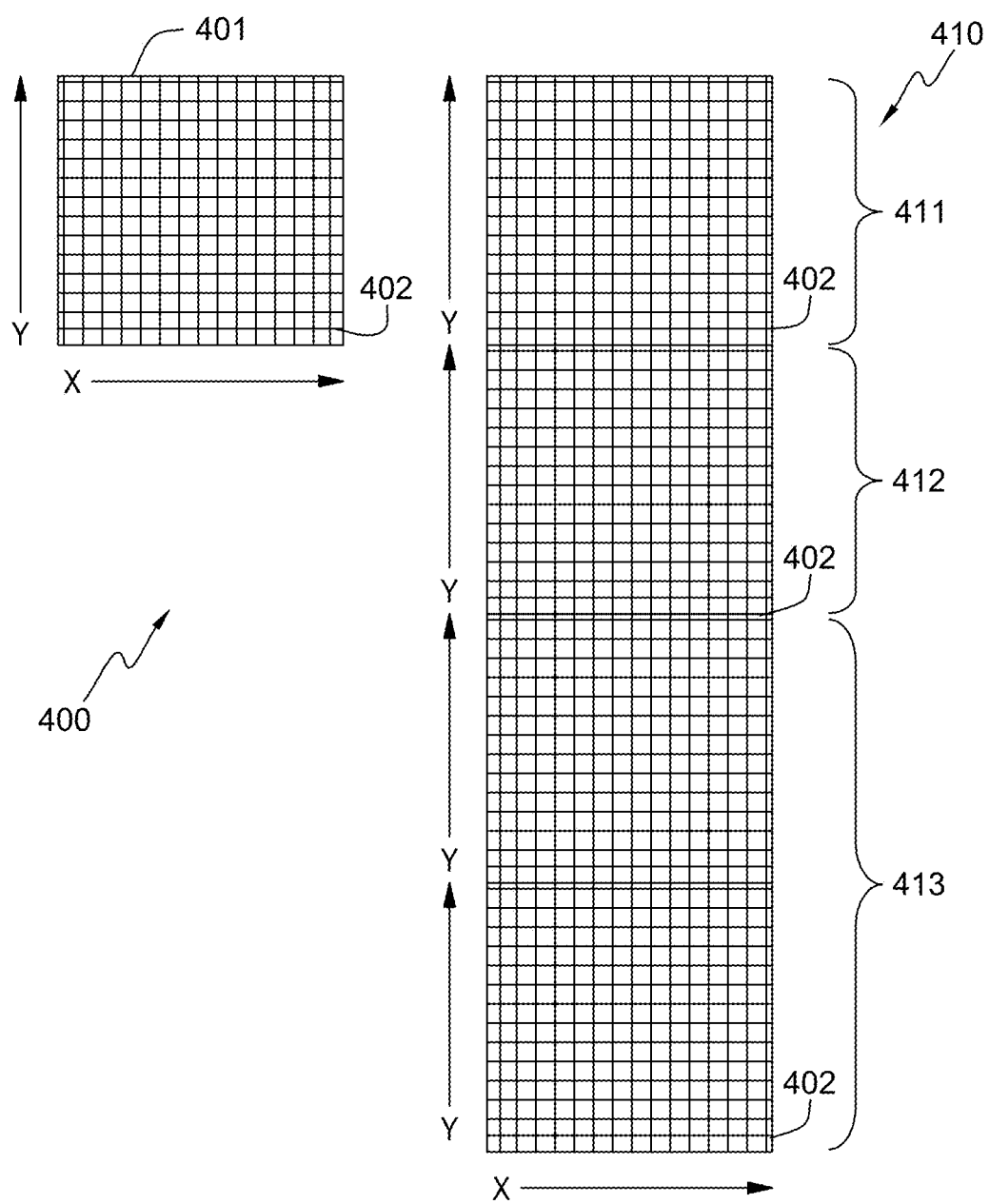
FIG. 4 is a schematic diagram of an input image and concatenated images, in accordance with an embodiment of the present invention.

Referring to FIG. 4, a schematic diagram 400 shows an original input image 401 of dimensions X*Y pixels 402. An image is composed of pixel values, stored in a file as matrices for each of the colors used for the image. Typically, grey or panchromatic images only need one matrix, while Red, Green, Blue images use three matrices, one per color.

The resulting image data 410 is illustrated as the original image data 411 with concatenated filter data, in this case filter data 412 of a first filter and filter data 413 of a second filter. The filter data is concatenated below the original data in this example. The second filter data 413 is larger than the original image data 411 and therefore the height is extended by another image height Y to accommodate the additional data.

Figure 5A:
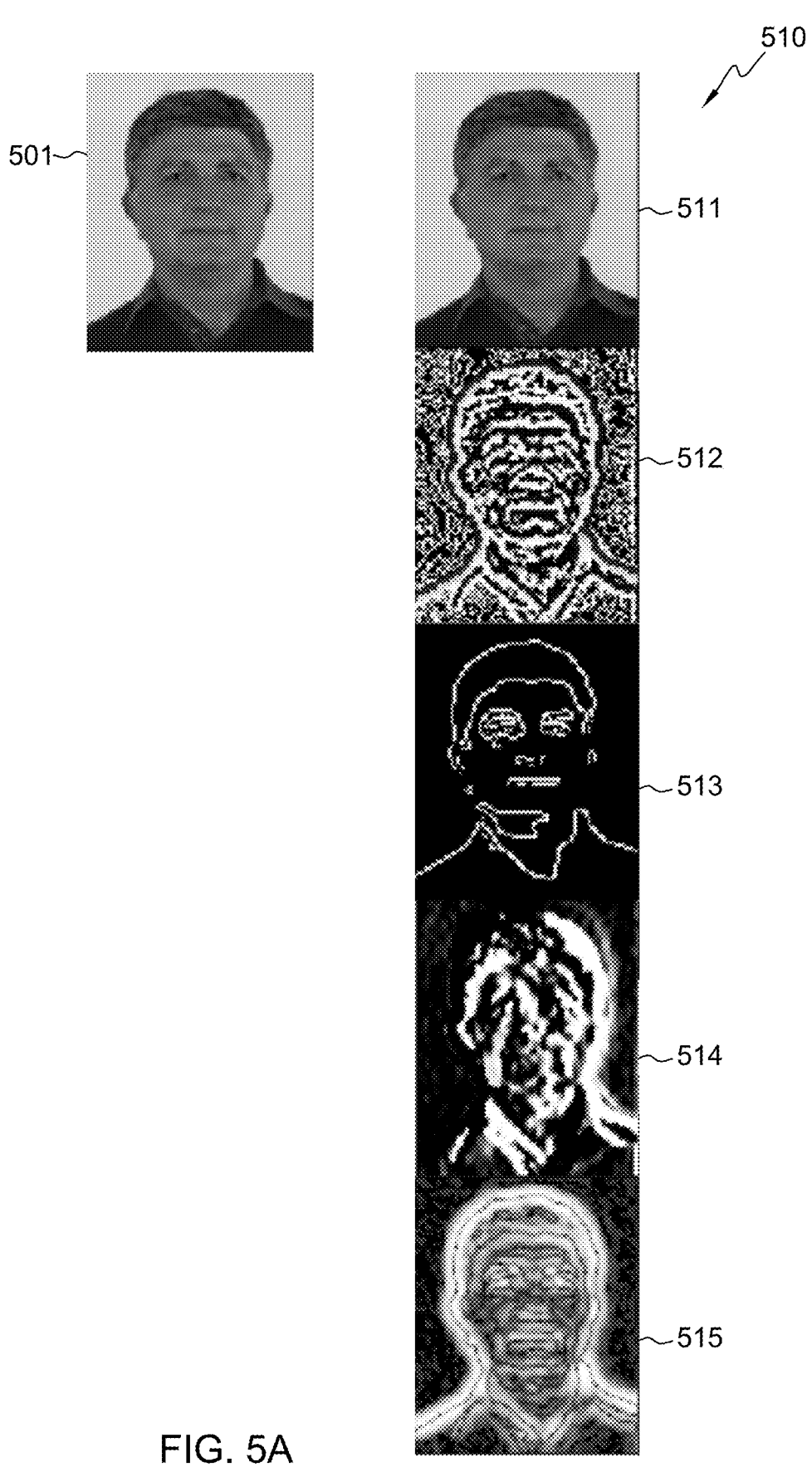
FIGS. 5A, 5B and 5C are photographic diagrams of an input image and concatenated images, in accordance with an embodiment of the present invention.
Figure 5B:
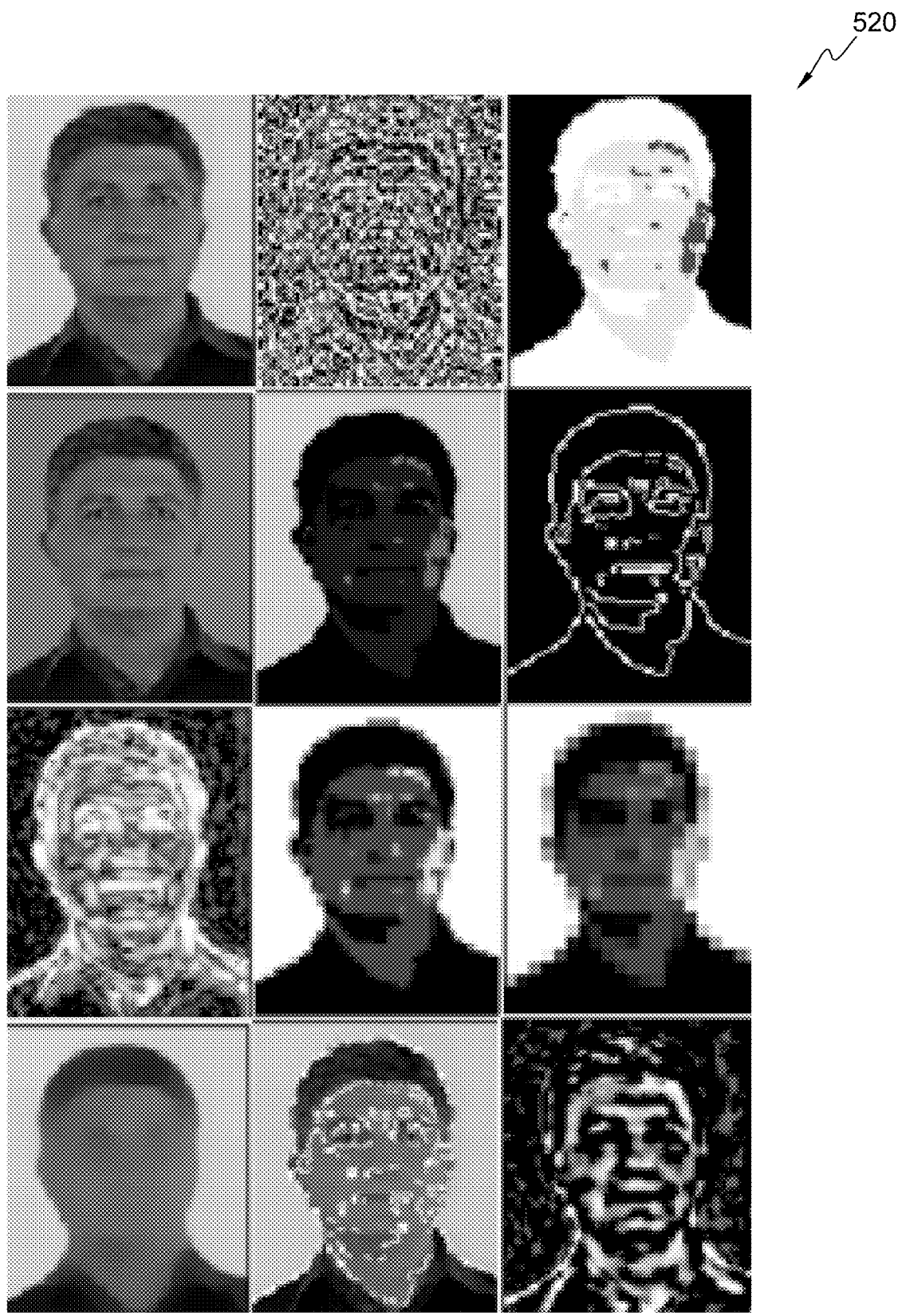
Figure 5C:

Referring to FIGS. 5A, 5B and 5C photographic schematic diagrams illustrate the described method. An input image 501 is shown of an image of a person.

FIG. 5A shows a created artificial image 510 with the original image 511 and four filter images 512, 513, 514, 515. The computed filters result in matrices that are used as if they were image data. The reason for creating new images is that the process of usual neural networks for analyzing images is unchanged as it will take additional processed data as if it was an image data.

FIG. 5B shows a created artificial image 520 with 11 filters added as a rectangular filling. FIG. 5C shows a created artificial image 530 illustrating further possible filters without resizing of Wavelet filters. The filters shown in FIGS. 5A, 5B and 5C are shown as greyscale photographs; however, they may include color images when processing color planes.

The image data is augmented, so the process is additive on the initial input data and experiments show that the convergence of neural network weights is significantly faster. In one test a convergence was obtained in 5 epochs (iterations) instead of 100 when using only the original image.

The implication is that by using the described method, the neural networks will not need to discover the simple filters. In addition, neural network layers may not be able to compute some of the more complex filters such as Wavelets, Contours, etc.

The result is that the training is accelerated and much more precise. The approach changes the training data set that could then be fed for processing.

Figure 6:
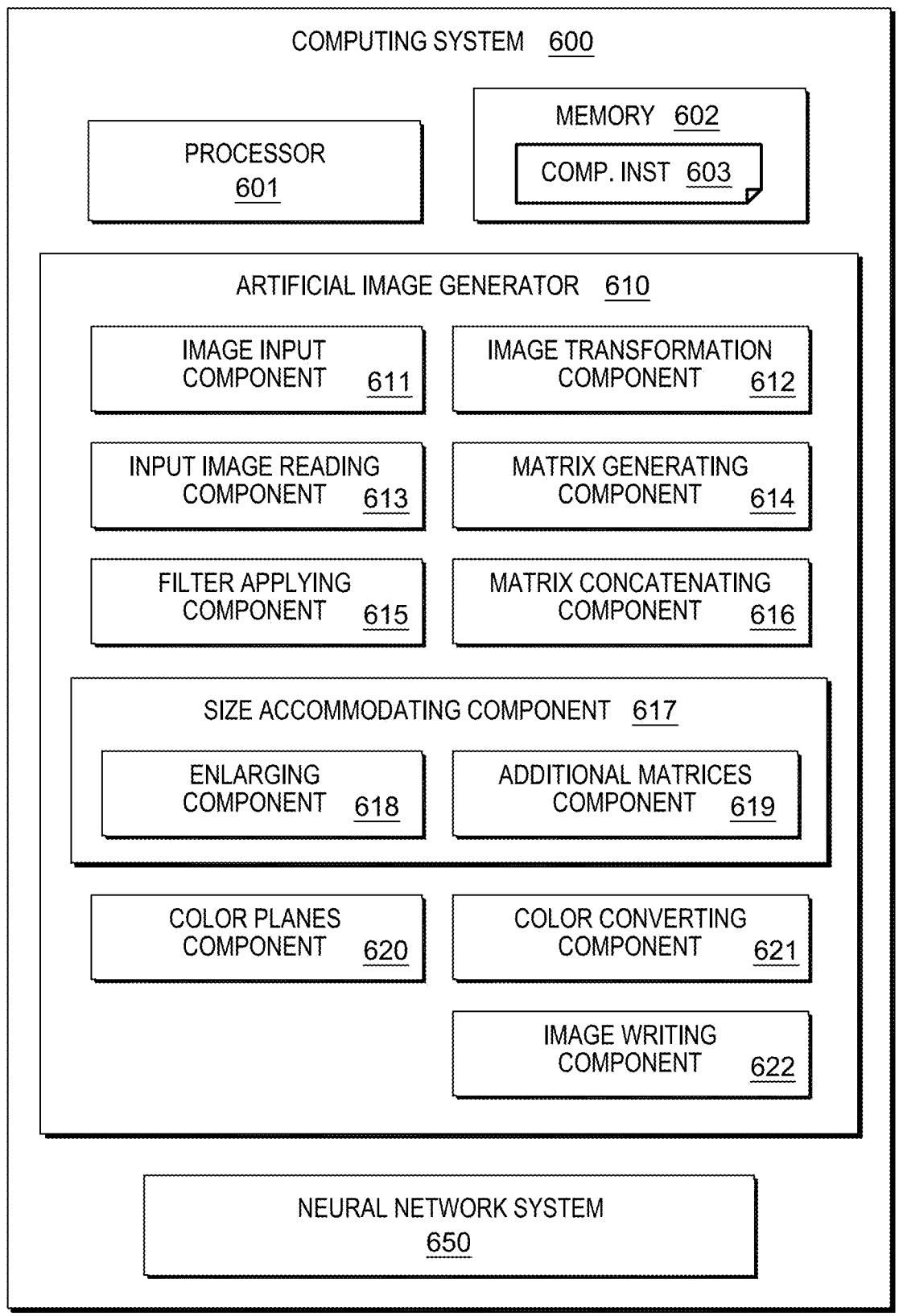
FIG. 6 is a block diagram of an example embodiment of a system, in accordance with an embodiment of the present invention.

Referring to FIG. 6, a block diagram shows an example embodiment of a computing system 600 including an artificial image generator 610 for use with a neural network system 650. The artificial image generator 610 may be provided remotely from the neural network system 650.

The computing system 600 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The artificial image generator 610 may include an image input component 611 for receiving one or more images to be processed and an image transformation component 612 for performing classical image transformations on the input image prior to creating the input matrix.

The artificial image generator 610 may include an input image reading component 613 for reading an input image and a matrix generating component 614 for creating an input matrix of input image data.

The artificial image generator 610 may include a filter applying component 615 for applying one or more filter computations to the input matrix to return resulting matrices. The filters may be linear or non-linear filters and, for example, may include one or more of the group of: Threshold Binary Inverted or Not; Threshold Truncate; Threshold to Zero; Canny edges; Absolute difference between Gaussian Blur and Median Blur; Wavelet multiple approximations, 'a', 'aa' with db1 or other Wavelet algorithms resized to image size; Median Blur; and Contours on Canny Edge.

The artificial image generator 610 may include a matrix concatenating component 616 for concatenating the resulting matrices to the input matrix. The matrix concatenating component 616 may append the resulting matrix adjacent the input matrix or a previously returned resulting matrix of a previous filter. Where the input image has a size of (width, height), the artificial image may have a resulting size of one of the group of: (width, height*(1+number of filters)); (width*(1+number of filters), height); and (width*(1+x), height (1+y)) where (1+x)*(1+y)−1>number of filters.

The artificial image generator 610 may include a size accommodating component 617 for accommodating a different size of resulting matrix compared to the input matrix. The size accommodating component 617 may include an enlarging component 618 for accommodating resulting images smaller than the input matrix. The enlarging component 618 may resize using one of the group of: pixel duplication, interpolation or extrapolation, and padded with constant values to match the input image size. The size accommodating component 617 may include an additional matrices component 619 for accommodating a resulting matrix larger than the input matrix by providing additional matrices to accommodate the additional size.

The artificial image generator 610 may include a color planes component 620 for handling a colored input image and the input matrix has color layers for individual colors of the form Width*Height*Number of Color Layers and the filter applying component 615 applies a filter to each color layer.

The artificial image generator 610 may include a color converting component 621 for converting a colored input image by stacking color plane matrices to create an artificial grey image and the filter applying component 615 may apply a filter to the grey image.

The artificial image generator 610 may include an image writing component 622 for writing the image data of the concatenated matrix as an artificial image suitable for use in neural networks.

Figure 7:
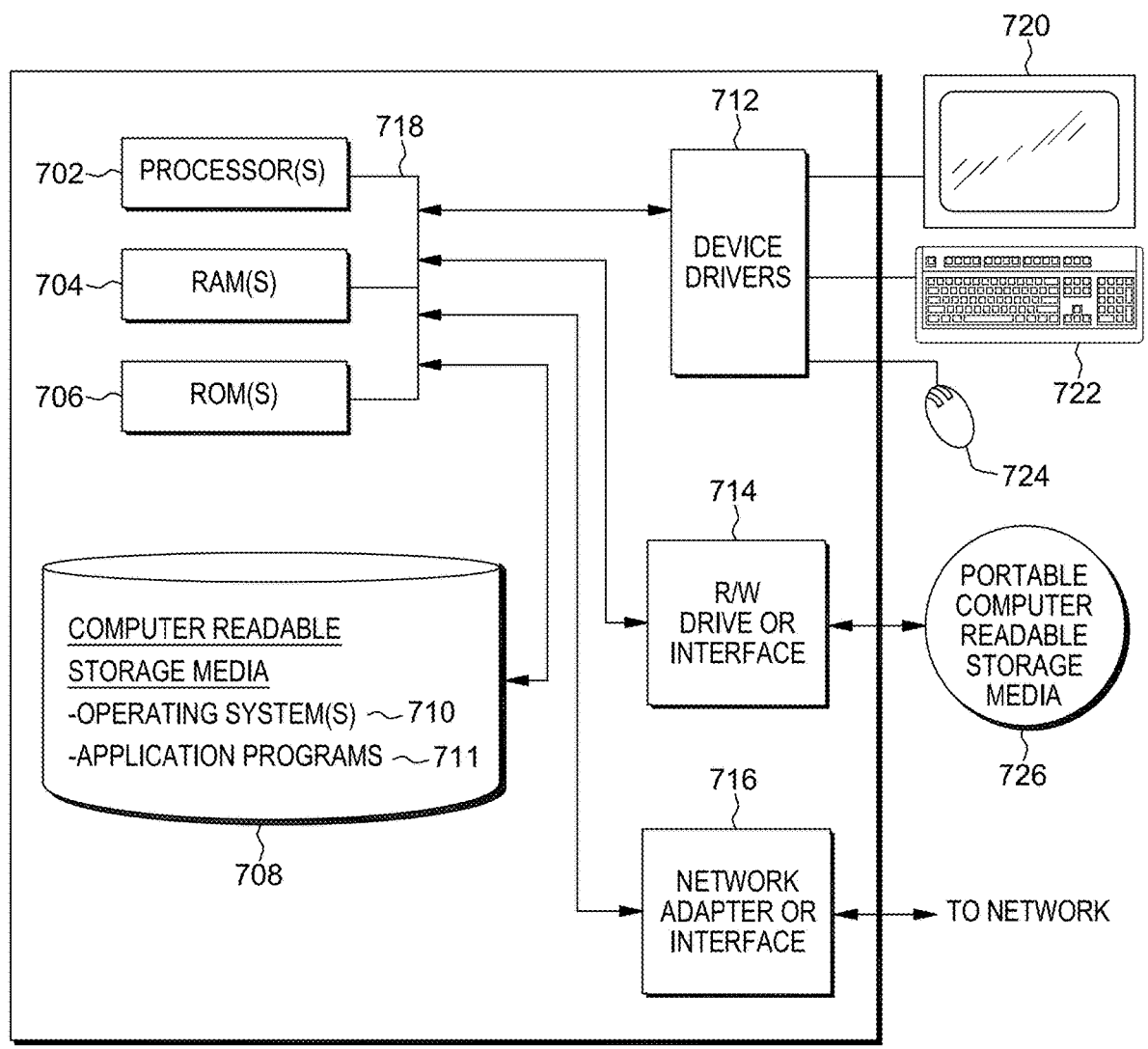
FIG. 7 is a block diagram of an embodiment of a computer system or cloud server in which the present invention may be implemented.

FIG. 7 depicts a block diagram of components of the computing system 600 of FIG. 6, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing system 600 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as the artificial image generator 610 and neural network system 650 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 600 can also include a R/W drive or interface 714 to read from and write to one or more portable computer readable storage media 726. Application programs 711 on computing system 600 can be stored on one or more of the portable computer readable storage media 726, read via the respective R/W drive or interface 714 and loaded into the respective computer readable storage media 708.

Computing system 600 can also include a network adapter or interface 716, such as a TCP/IP adapter card or wireless communication adapter. Application programs 711 on computing system 600 can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing system 600 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
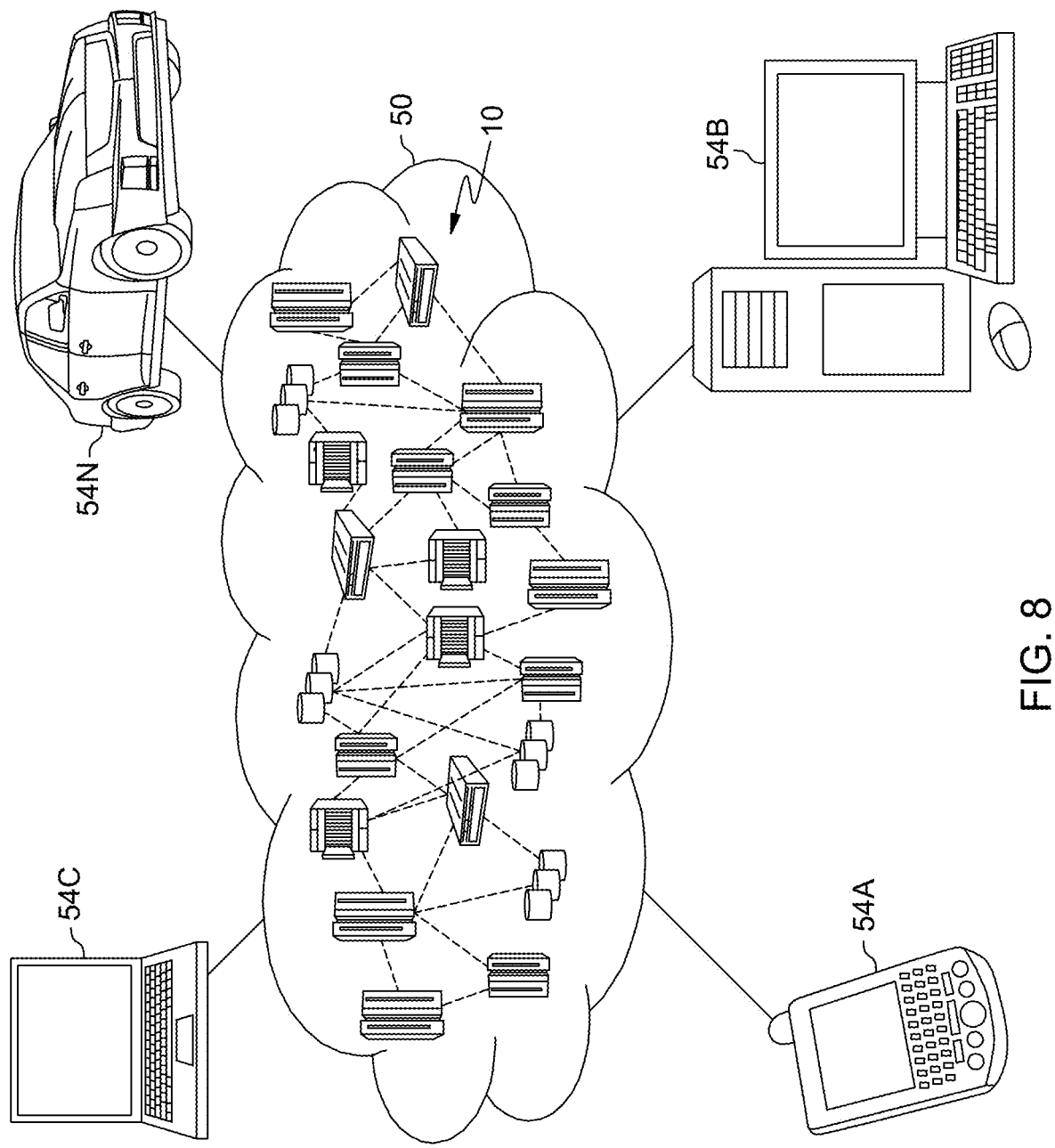
FIG. 8 is a schematic diagram of a cloud computing environment in which the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
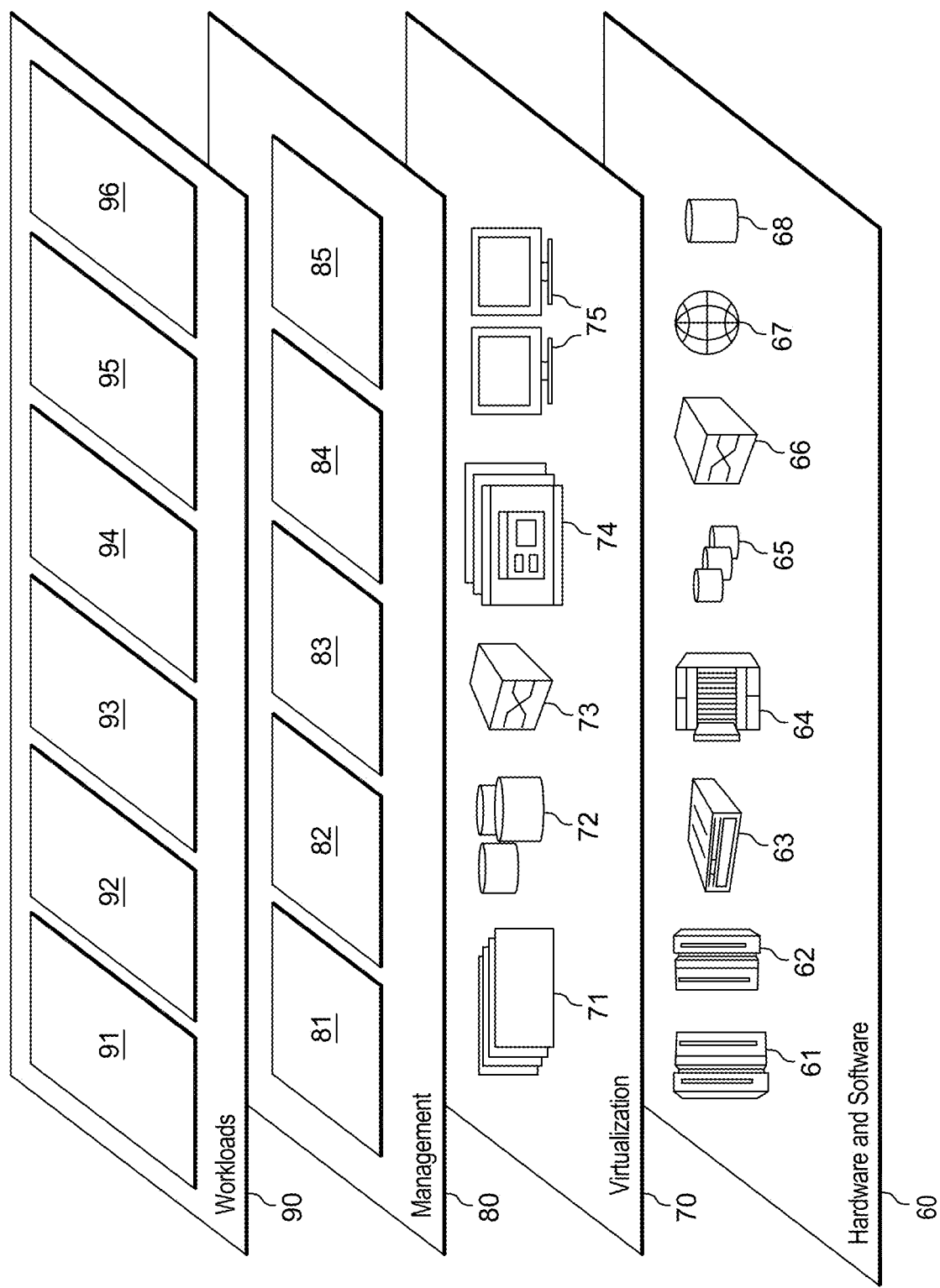
FIG. 9 is a diagram of abstraction model layers of a cloud computing environment in which the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method comprising:
creating, by one or more processors, an input matrix of image data for a received image;
responsive to selecting a first image filter for generating an artificial image, applying, by one or more processors, a first filter computation for the first image filter to the input matrix of image data, wherein applying the first filter computation generates a first resulting matrix of image data;
concatenating, by one or more processors, the first resulting matrix of image data to the input matrix of image data to generate a first concatenated matrix of image data; and
generating, by one or more processors, an artificial image suitable for use in neural networks based on the concatenated matrix of image data.

2. The method of claim 1, further comprising:
responsive to selecting a second image filter for generating the artificial image, applying, by one or more processors, a second filter computation for the second image filter to the input matrix of image data; and
concatenating, by one or more processors, the first resulting matrix of image data and the second resulting matrix of image data to the input matrix of image data to generate a second concatenated matrix of image data.

3. The method of claim 2, further comprising:
appending, by one or more processors, the first resulting matrix of image data adjacent to the second resulting matrix of image data.

4. The method as claimed in claim 1, further comprising:
modifying, by one or more processors, a first size of the first resulting matrix of image data to match a second size of the input matrix of image data.

5. The method as claimed in claim 4, wherein the first size of the first resulting matrix of image data is smaller than the input matrix of image data and modifying a first size of the first resulting matrix of image data includes pixel duplication, interpolation, extrapolation, or padding with constant values to match a second size of the input matrix of image data.

6. The method as claimed in claim 4, wherein the first size of the first resulting matrix of image data is larger than the input matrix of image data and modifying a first size of the first resulting matrix of image data includes providing additional matrices to accommodate additional matrix data.

7. The method as claimed in claim 1, wherein the received image is panchromatic.

8. The method as claimed in claim 1, wherein applying a first filter computation for the first image filter to the input matrix of image data further comprises:
applying, by one or more processors, the first filter computation to each color layer of the input matrix of image data separately to return a single concatenated matrix for each color plane.

9. The method as claimed in claim 8, wherein each color layer is stacked to create an artificial grey image input matrix of image data.

10. A computer system comprising:
one or more computer processors;
one or more computer readable storage media; and
program instructions stored on the computer readable storage media for execution by at least one of the one or more computer processors, the program instructions comprising:
program instructions to create an input matrix of image data for a received image;
program instructions to, responsive to selecting a first image filter for generating an artificial image, apply a first filter computation for the first image filter to the input matrix of image data, wherein applying the first filter computation generates a first resulting matrix of image data;
program instructions to concatenate the first resulting matrix of image data to the input matrix of image data to generate a first concatenated matrix of image data; and
program instructions to generate an artificial image suitable for use in neural networks based on the concatenated matrix of image data.

11. The computer system of claim 10, further comprising program instructions, stored on the one or more computer readable storage media, which when executed by a processor, cause the processor to:
responsive to selecting a second image filter for generating the artificial image, apply a second filter computation for the second image filter to the input matrix of image data; and
concatenate the first resulting matrix of image data and the second resulting matrix of image data to the input matrix of image data to generate a second concatenated matrix of image data.

12. The computer system of claim 11, further comprising program instructions, stored on the one or more computer readable storage media, which when executed by a processor, cause the processor to:
append the first resulting matrix of image data adjacent to the second resulting matrix of image data.

13. The computer system as claimed in claim 10, further comprising program instructions, stored on the one or more computer readable storage media, which when executed by a processor, cause the processor to:

modify a first size of the first resulting matrix of image data to match a second size of the input matrix of image data.

14. The computer system as claimed in claim 13, wherein the first size of the first resulting matrix of image data is smaller than the input matrix of image data and modify a first size of the first resulting matrix of image data includes pixel duplication, interpolation, extrapolation, or padding with constant values to match a second size of the input matrix of image data.

15. The computer system as claimed in claim 13, wherein the first size of the first resulting matrix of image data is larger than the input matrix of image data and modify a first size of the first resulting matrix of image data includes providing additional matrices to accommodate additional matrix data.

16. The computer system as claimed in claim 10, wherein the received image is panchromatic.

17. The computer system as claimed in claim 10, wherein applying a first filter computation for the first image filter to the input matrix of image data further comprises program instructions, stored on the one or more computer readable storage media, which when executed by a processor, cause the processor to:

apply the first filter computation to each color layer of the input matrix of image data separately to return a single concatenated matrix for each color plane.

18. The computer system as claimed in claim 17, wherein each color layer is stacked to create an artificial grey image input matrix of image data.

19. A computer program product comprising:
one or more computer readable storage media and program instructions stored on at least one of the one or more storage media, the program instructions comprising:
program instructions to create an input matrix of image data for a received image;
program instructions to, responsive to selecting a first image filter for generating an artificial image, apply a first filter computation for the first image filter to the input matrix of image data, wherein applying the first filter computation generates a first resulting matrix of image data;
program instructions to concatenate the first resulting matrix of image data to the input matrix of image data to generate a first concatenated matrix of image data; and
program instructions to generate an artificial image suitable for use in neural networks based on the concatenated matrix of image data.

20. The computer program product of claim 19, further comprising program instructions, stored on the one or more computer readable storage media, which when executed by a processor, cause the processor to:
responsive to selecting a second image filter for generating the artificial image, apply a second filter computation for the second image filter to the input matrix of image data; and
concatenate the first resulting matrix of image data and the second resulting matrix of image data to the input matrix of image data to generate a second concatenated matrix of image data.

* * * * *